(12) United States Patent
Miyao et al.

(10) Patent No.: US 9,081,182 B2
(45) Date of Patent: Jul. 14, 2015

(54) VIRTUAL IMAGE DISPLAY APPARATUS

(75) Inventors: Toshiaki Miyao, Matsumoto (JP); Masayuki Takagi, Shiojiri (JP); Takahiro Totani, Suwa (JP); Akira Komatsu, Kamiina-gun (JP); Takashi Takeda, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 74 days.

(21) Appl. No.: 13/353,641

(22) Filed: Jan. 19, 2012

(65) Prior Publication Data

US 2012/0200935 A1      Aug. 9, 2012

(30) Foreign Application Priority Data

Feb. 4, 2011  (JP) ................. 2011-022441

(51) Int. Cl.
  *G02B 27/14* (2006.01)
  *G02B 27/01* (2006.01)
  *G02B 6/00* (2006.01)

(52) U.S. Cl.
  CPC .............. *G02B 27/0172* (2013.01); *G02B 6/00* (2013.01)

(58) Field of Classification Search
  CPC ............................ G02B 27/0172; G02B 6/00
  USPC ................... 359/630–633; 345/7–9; 348/115
  See application file for complete search history.

(56) References Cited

U.S. PATENT DOCUMENTS

| | | | |
|---|---|---|---|
| 6,124,977 A | 9/2000 | Takahashi | |
| 6,219,188 B1 | 4/2001 | Tsukamoto | |
| 7,944,616 B2 * | 5/2011 | Mukawa | 359/630 |
| 8,052,308 B2 | 11/2011 | Kamijima | |
| 2001/0010598 A1 * | 8/2001 | Aritake et al. | 359/630 |
| 2003/0034935 A1 | 2/2003 | Amanai et al. | |
| 2004/0085649 A1 | 5/2004 | Repetto et al. | |
| 2004/0109208 A1 | 6/2004 | Amanai et al. | |
| 2005/0174651 A1 * | 8/2005 | Spitzer et al. | 359/630 |
| 2006/0087755 A1 | 4/2006 | Richard | |
| 2007/0047091 A1 | 3/2007 | Spitzer et al. | |
| 2007/0058261 A1 * | 3/2007 | Sugihara et al. | 359/630 |
| 2008/0198097 A1 | 8/2008 | Ishino et al. | |
| 2008/0239422 A1 | 10/2008 | Noda | |
| 2010/0103078 A1 | 4/2010 | Mukawa et al. | |

(Continued)

FOREIGN PATENT DOCUMENTS

| | | |
|---|---|---|
| JP | A-11-142783 | 5/1999 |
| JP | A-11-249067 | 9/1999 |

(Continued)

OTHER PUBLICATIONS

Jan. 29, 2013 Office Action issued in U.S. Appl. No. 13/357,205.

(Continued)

*Primary Examiner* — Scott J Sugarman
*Assistant Examiner* — Vipin Patel
(74) *Attorney, Agent, or Firm* — Oliff PLC

(57) ABSTRACT

A support frame includes a light transmissive portion that is combined with a light guide member to form a see-through portion. The support frame assembled with the light guide member for image light observation therefore allows see-through observation of an outside-world object through the see-through portion. Further, providing the light transmissive portion in the support frame can increase the strength of the support frame while reducing the weight of the light guide member.

12 Claims, 11 Drawing Sheets

(56) References Cited

U.S. PATENT DOCUMENTS

| | | |
|---|---|---|
| 2010/0245211 A1 | 9/2010 | Iba et al. |
| 2012/0200936 A1 | 8/2012 | Takagi et al. |
| 2012/0200937 A1 | 8/2012 | Totani et al. |
| 2012/0200938 A1 | 8/2012 | Totani et al. |
| 2012/0206817 A1 | 8/2012 | Totani et al. |
| 2013/0069850 A1 | 3/2013 | Mukawa et al. |

FOREIGN PATENT DOCUMENTS

| | | | |
|---|---|---|---|
| JP | A-2002-318366 | 10/2002 | |
| JP | A-2004-157520 | 6/2004 | |
| JP | A-2006-3879 | 1/2006 | |
| JP | 2007-505352 A | 3/2007 | |
| JP | A-2007-129550 | 5/2007 | |
| JP | A-2008-052096 | 3/2008 | |
| JP | A-2008-122511 | 5/2008 | |
| JP | A-2008-165016 | 7/2008 | |
| JP | A-2008-535001 | 8/2008 | |
| JP | A-2008-249869 | 10/2008 | |
| JP | A-2008-268873 | 11/2008 | |
| JP | WO2010041578 A1 * | 4/2010 | ............ G02B 27/01 |
| JP | A-2010-102077 | 6/2010 | |
| JP | A-2010-224473 | 10/2010 | |
| JP | A-2010-230716 | 10/2010 | |
| JP | A-2010-276914 | 12/2010 | |
| WO | WO 2005/024491 A1 | 3/2005 | |
| WO | WO 2005/024969 A2 | 3/2005 | |

OTHER PUBLICATIONS

Jan. 30, 2013 Office Action issued in U.S. Appl. No. 13/363,732.
Jul. 23, 2013 Office Action issued in U.S. Appl. No. 13/355,893.

* cited by examiner

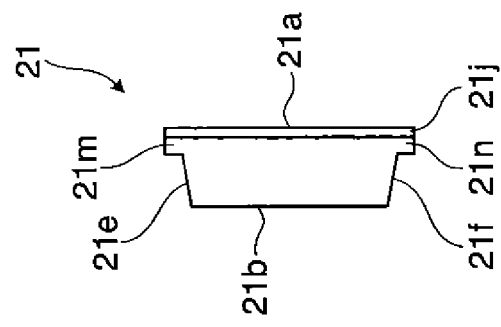
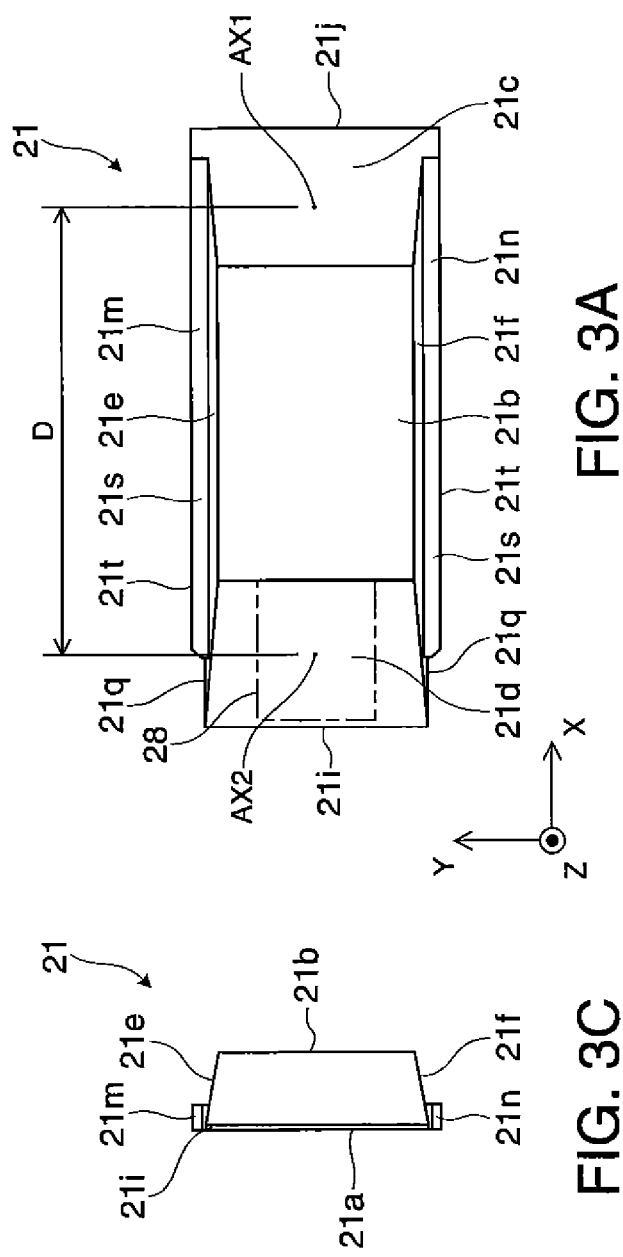
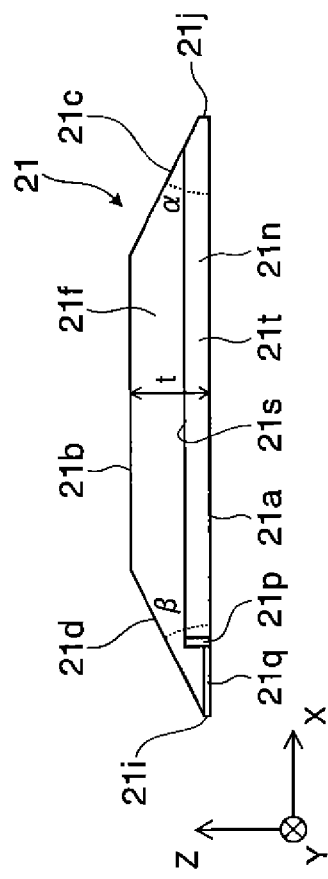
FIG. 3D
FIG. 3A
FIG. 3B
FIG. 3C

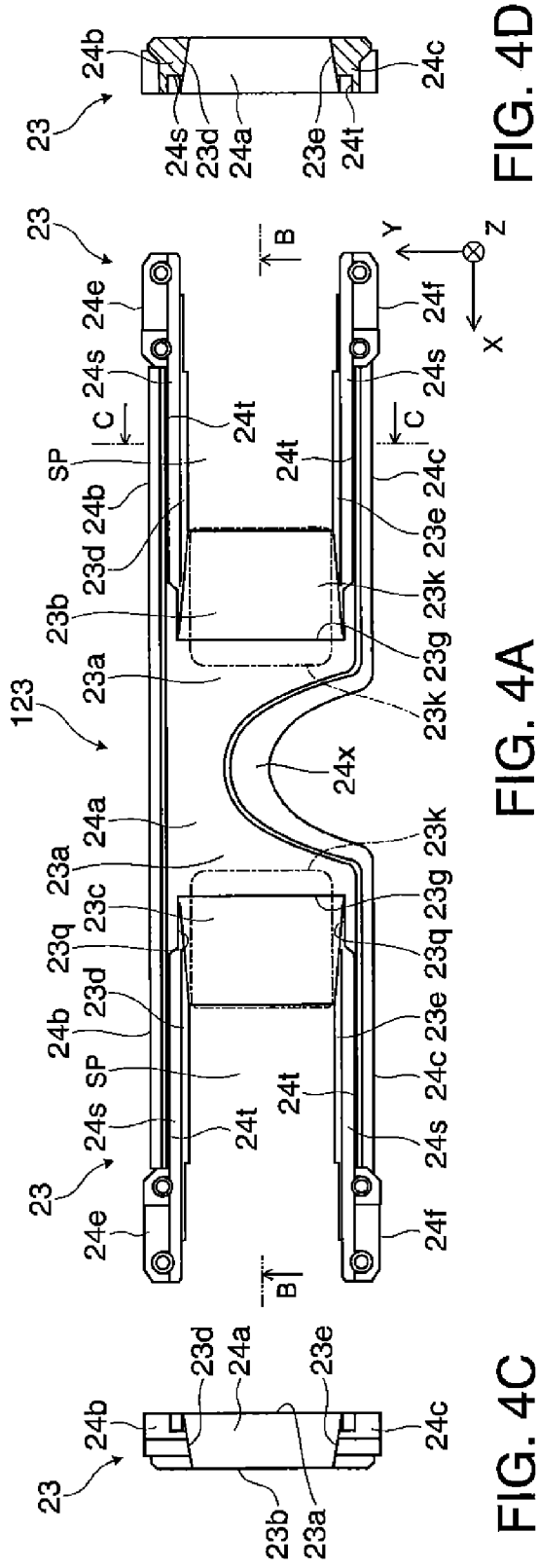
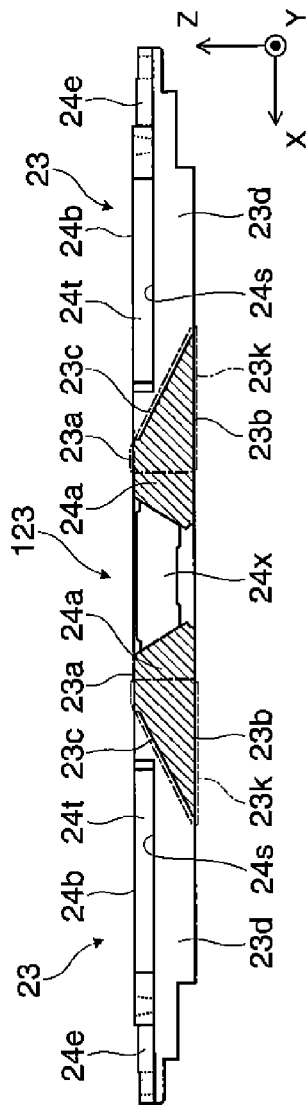
FIG. 4A
FIG. 4B
FIG. 4C
FIG. 4D

VIRTUAL IMAGE DISPLAY APPARATUS

BACKGROUND

1. Technical Field

The present invention relates to a virtual image display apparatus, such as a head mounted display worn on the head.

2. Related Art

As a virtual image display apparatus that allows formation and observation of a virtual image, such as a head mounted display, a variety of apparatuses that guides image light from a display device through a light guide plate to the pupils of a viewer have been proposed in recent years.

For a virtual image display apparatus of this type, see-through optical systems have been proposed to superimpose image light and external light (see JP-A-2006-3879 and JP-A-2010-224473).

However, since the apparatus described in JP-A-2006-3879 or any other document achieves a see-through configuration based on a pupil division method in which a light guide optical system having a light exiting aperture smaller than the size of the pupil is used, it is difficult to increase the size of a displayed virtual image. Further, a light guide optical system having a light exiting aperture smaller than the size of the pupil is used, it is difficult to increase an effective pupil diameter (light introducing diameter that allows virtual image to be captured and also called eye ring diameter) in order to support a variety of human interpupillary distances. Moreover, since the light exiting aperture of the light guide optical system and an enclosure are physically disposed in the vicinity of the pupil, a blind spot is produced and the resultant configuration is not perfectly see-through.

SUMMARY

An advantage of some aspects of the invention is to provide a virtual image display apparatus having a simple configuration capable of increasing the size of a displayed virtual image, ensuring a large eye ring diameter, and achieving satisfactory see-through observation.

An aspect of the invention is directed to a virtual image display apparatus including (a) a light guide member including a light guide portion, a light incident portion through which image light is incident on the light guide portion, and a light exiting portion out of which the image light guided through the light guide portion exits, the light guide member allowing observation of the image light through the light exiting portion, and (b) a support frame that supports the light guide member, (c) wherein the support frame includes a light transmissive portion that is combined with the light guide member to form a see-through portion.

In the virtual image display apparatus described above, since the support frame includes the light transmissive portion, which is combined with the light guide member to form the see-through portion, the support frame assembled with the light guide member for image light observation allows see-through observation of an outside-world object through the see-through portion. Further, providing the light transmissive portions in the support frame can increase the strength of the support frame while reducing the weight of the light guide members. Further, the size of a displayed virtual image can be increased when image light is superimposed on outside-world light in the light exiting portion of the light guide member for see-through observation of the outside-world light. Moreover, it is not necessary to employ the pupil division method with the light exiting portion located close to the pupil, and the eye ring diameter can be increased.

In a specific aspect of the invention, in the virtual image display apparatus described above, the light guide portion has a first reflection surface and a second reflection surface that are disposed in parallel to each other and allow light to be guided while totally reflected. The light incident portion has a third reflection surface inclined to the first reflection surface by a predetermined angle. The light exiting portion has a fourth reflection surface inclined to the first reflection surface by a predetermined angle. The fourth reflection surface has a half-silvered mirror provided thereon. The light transmissive portion has a wedge-shaped member bonded to the light guide member. In the virtual image display apparatus, image light reflected off the third reflection surface of the light incident portion propagates while being totally reflected off the first and second reflection surfaces of the light guide portion, is reflected off the fourth reflection surface of the light exiting portion, and then enters as a virtual image the eye of a viewer. In this case, the light guide member can be formed to have a polyhedral block-like external shape for highly precise observation. Further, the light transmissive portion allows the see-through observation through the half-silvered mirror on the fourth reflection surface to be less distorted.

In another aspect of the invention, the light transmissive portion has a light transmissive surface glued to the fourth reflection surface via the half-silvered mirror. In this case, the precision with which the light transmissive portion is shaped can be set to be lower than that with which the light guide member is shaped, and the amount of unwanted light can be reduced by gluing the light transmissive surface of the light transmissive portion to the fourth reflection surface of the light guide member.

In still another aspect of the invention, the light transmissive portion has a first surface disposed in parallel to the first reflection surface and a second surface disposed in parallel to the second reflection surface. This configuration allows highly flat see-through observation through the light transmissive portion.

Instill another aspect of the invention, the support frame includes a positioning member that positions the light guide member. The positioning member can precisely position the light guide member with respect to the support frame, whereby image light can form a precise virtual image with respect to a viewer who wears the support frame.

In still another aspect of the invention, the light guide member has an end surface between the first reflection surface and the fourth reflection surface, and the support frame has a locking surface as the positioning member, the locking surface formed between the first surface and the light transmissive surface and facing the end surface. The locking surface can position the fourth reflection surface and the light transmissive surface, which are so disposed that they are inclined to the first and second reflection surfaces, relatively in a precise manner.

Instill another aspect of the invention, the first, second, third, and fourth reflection surfaces of the light guide member are side surfaces thereof, and the light guide member further has a top surface and a bottom surface adjacent to the first, second, third, and fourth reflection surfaces. The support frame holds the light guide member by sandwiching the top and bottom surfaces of the light guide member. The light guide member can thus be stably supported and attached in a more precise manner.

In still another aspect of the invention, the first reflection surface of the light guide member is so positioned to be flush with the first surface of the light transmissive portion.

In still another aspect of the invention, the second reflection surface of the light guide member is so positioned to be flush with the second surface of the light transmissive portion.

In still another aspect of the invention, the virtual image display apparatus further includes an image display device that forms image light and a projection system on which the image light having exited from the image display device is incident. The number of reflection of first image light in the light guide portion that exits from a first partial area in the image display device differs from the number of reflection of second image light in the light guide portion that exits from a second partial area in the image display device that differs from the first partial area in terms of a trapping direction in which the guided light is reflected in accordance with the law of reflection. In this case, using image light fluxes reflected different times allows the angular width of the exiting angle of the image light fluxes that exit out of the light exiting portion to be increased. That is, the image light fluxes acquired from different areas or partial areas in the image display device can have relatively wide viewing angles, whereby the size of a displayed virtual image viewed through the light exiting portion can be increased. As described above, employing the structure in which image light fluxes reflected different times are acquired allows the size of the light exiting portion to be increased to cover the pupil without a large increase in the thickness of the light guide portion for satisfactory see-through observation.

In still another aspect of the invention, the trapping direction is parallel to a cross-sectional plane including a first optical axis passing through the projection system and a normal to the third reflection surface. In the trapping direction, the numbers of reflection of image light fluxes from different positions in the light guide portion can be different from one another by setting the exiting angles of the image light fluxes, that is, the angles of incidence of the image light fluxes on the light incident portion at different values.

In still another aspect of the invention, the light guide member and the support frame, each of which is integrally formed in an injection molding process, are formed independent from each other. In this case, the light guide member and the support frame can be produced in quantity with high precision by using an injection molding technology.

In still another aspect of the invention, each of the light guide member and the support frame is molded by using a thermally polymerized resin material. In this case, using a resin material reduces the weight and increases safety, and the molding can be performed stably and precisely by using heat curing.

BRIEF DESCRIPTION OF THE DRAWINGS

The invention will be described with reference to the accompanying drawings, wherein like numbers reference like elements.

FIG. 3A is a front view of a light guide member, FIG. 3B is a bottom view of the light guide member, FIG. 3C is a left side view of the light guide member, and FIG. 3D is a right side view of the light guide member.

FIG. 4A is a rear view of a support frame, FIG. 4B is a cross-sectional view of the support frame taken along the line BB, FIG. 4C is a left side view of the support frame, and FIG. 4D is a cross-sectional view of the support frame taken along the line CC.

DESCRIPTION OF EXEMPLARY EMBODIMENTS

A virtual image display apparatus according to an embodiment of the invention will be described below in detail with reference to the drawings.

A. Exterior Appearance of Virtual Image Display Apparatus

Figure 1:
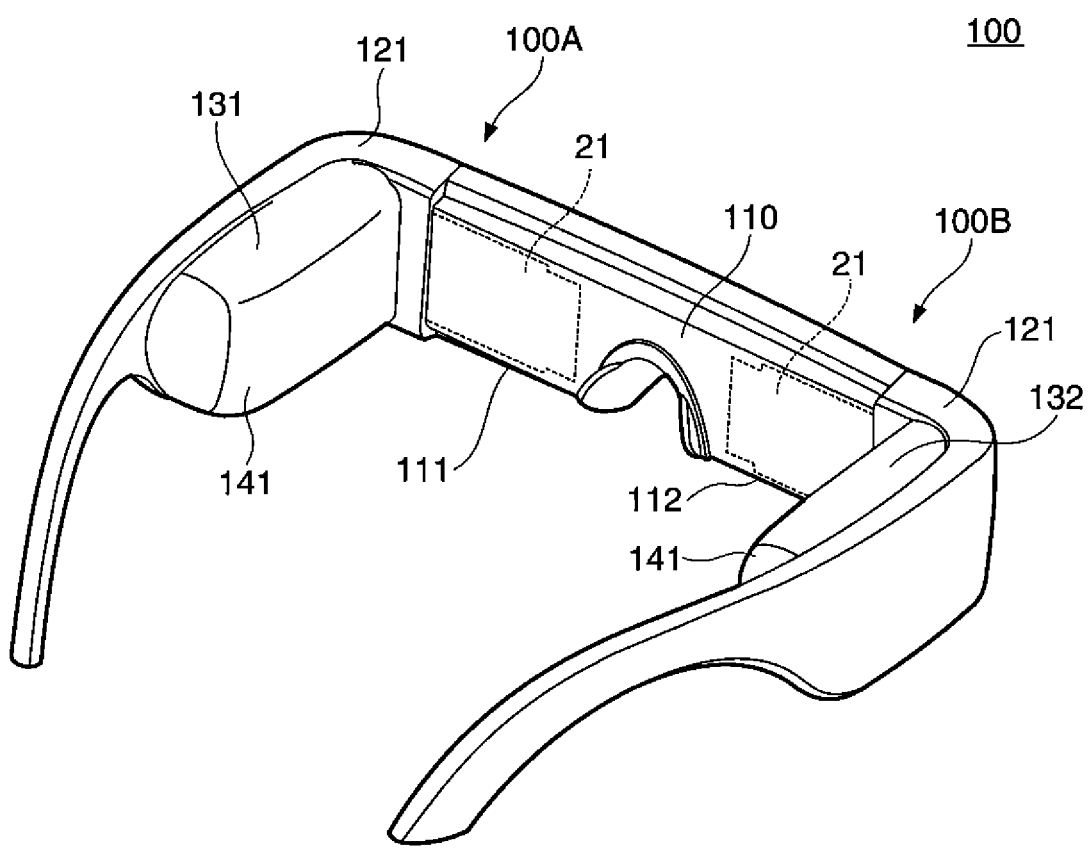
FIG. 1 is a perspective view showing a virtual image display apparatus according to an embodiment.

A virtual image display apparatus 100 according to an embodiment shown in FIG. 1 is a head mounted display having an eyeglass-like exterior appearance and allows a viewer who wears the virtual image display apparatus 100 to not only recognize image light in the form of virtual image but also view an outside-world image in a see-through manner. The virtual image display apparatus 100 includes an optical panel 110, which covers the front side of the eyes of the viewer, support portions 121, which support the optical panel 110, and first and second drivers 131, 132, each of which is attached to a portion extending from a exterior cover of the corresponding support portion 121 to a temple. The optical panel 110 includes a first panel portion 111 and a second panel portion 112, and the panel portions 111 and 112 are connected to each other at the center of the optical panel 110 to form an integrated plate-shaped part. In FIG. 1, the first panel portion 111 on the left side is combined with the first driver 131 to form a first display apparatus 100A, which forms a virtual image for the left eye and also functions alone as a virtual image display apparatus. Similarly, in FIG. 1, the second panel portion 112 on the right side is combined with the second driver 132 to form a second display apparatus 100B, which forms a virtual image for the right eye and also functions alone as a virtual image display apparatus. Each of the first driver 131 and the second driver 132 is individually accommodated in a light-blocking, protective housing 141.

B. Structure of Display Apparatus

Figure 2A:
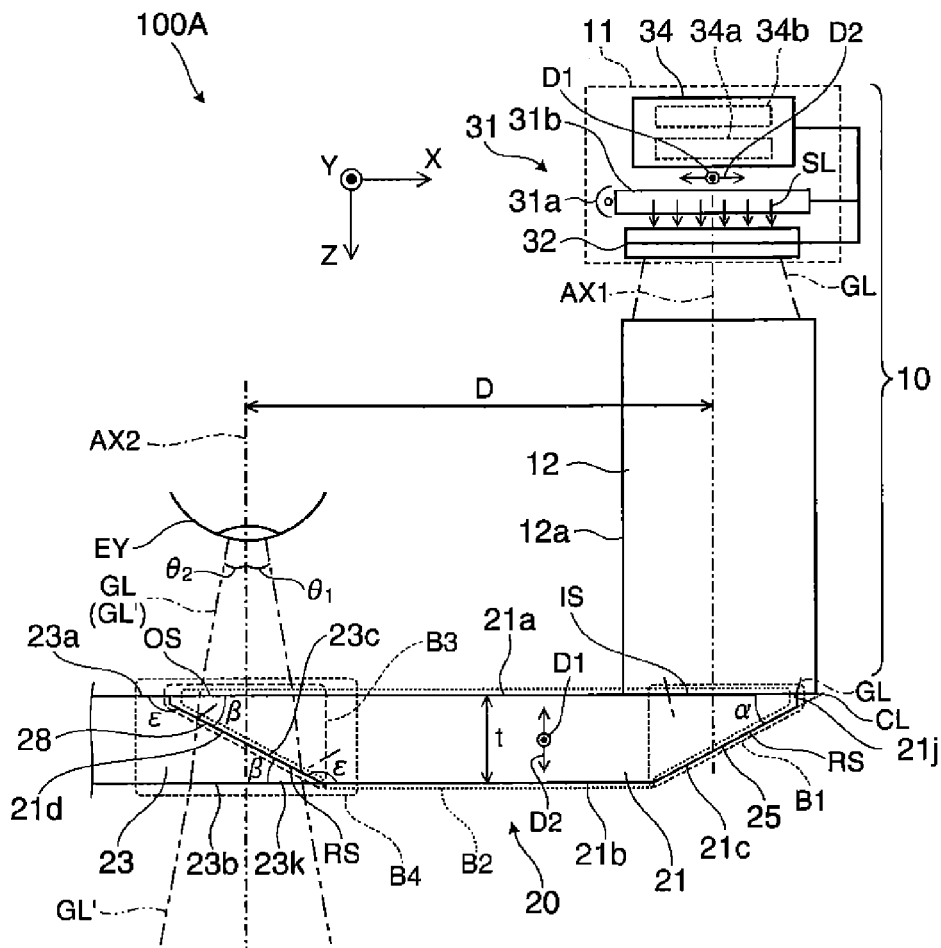
FIG. 2A is a partial cross-sectional view of a main portion of a first display apparatus that forms the virtual image display apparatus.

The first display apparatus 100A includes an image formation device 10 and a light guide device 20, as shown in FIG. 2A and other figures. The second display apparatus 100B shown in FIG. 1 has the same structure as that of the first display apparatus 100A but a horizontally reversed structure, and no detailed description of the second display apparatus 100B will therefore be made.

Figure 2B:
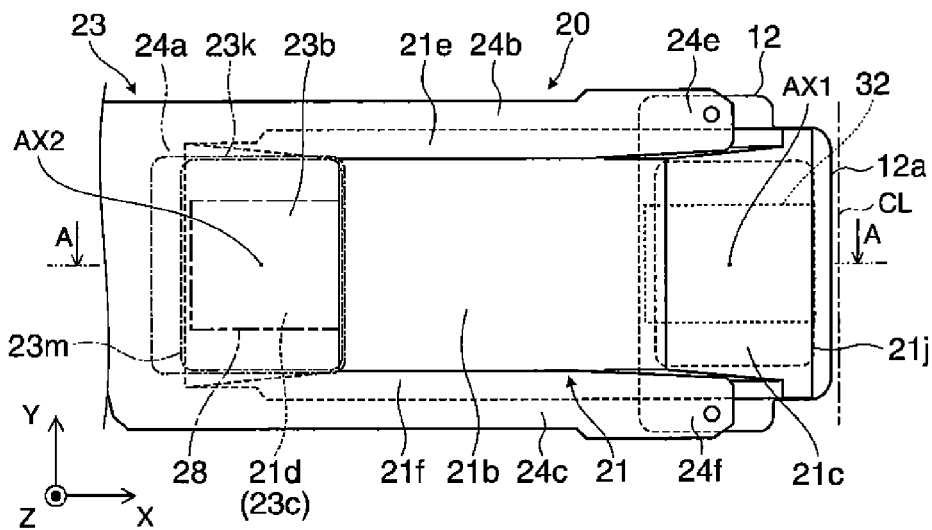
FIG. 2B is a front view of the main portion.

In the first display apparatus 100A shown in FIG. 2A and other figures, the image formation device 10 corresponds to the first driver 131 in FIG. 1, and the light guide device 20 corresponds to the first panel portion 111 in FIG. 1. The image formation device 10 shown in FIG. 2A is a main portion thereof without the housing 141 shown in FIG. 1. The light guide device 20 shown in FIG. 2A is a cross section taken along the line AA in FIG. 2B.

The image formation device 10 includes an image display device 11 and a projection system 12. The image display device 11 includes an illuminator 31, which emits two-dimensional illumination light SL, a liquid crystal display device 32, which is a transmissive spatial light modulator, and a drive controller 34, which controls the operation of the illuminator 31 and the liquid crystal display device 32. The illuminator 31 includes a light source 31a, which emits light containing three colors, red, green, and blue, and a backlight light guide 31b, which diffuses the light from the light source 31a into a light flux having a rectangular cross-sectional shape. The liquid crystal display device 32 spatially modulates the illumination light SL from the illuminator 31 to form image light to be displayed, such as video images. The drive controller 34 includes a light source drive circuit 34a and a liquid crystal drive circuit 34b. The light source drive circuit 34a supplies electric power to the light source 31a in the illuminator 31 to allow it to produce the illumination light SL having stable luminance. The liquid crystal drive circuit 34b outputs an image signal or a drive signal to the liquid crystal display device 32 to allow it to form color image light based on which video images or still images are produced in the form of transmittance pattern. A power supply that energizes the drive controller 34 and other components can be provided external to the image formation device 10, that is, can be an external power supply for weight reduction purposes. Further, the liquid crystal drive circuit 34b or an external control circuit may have an image processing capability. The projection system 12, only a lens barrel 12a of which is shown in FIG. 2A, is a collimator lens that converts image light having exited from each point on the liquid crystal display device 32 into a collimated light flux.

In the liquid crystal display device 32, a first direction D1 corresponds to the direction in which a vertical cross-sectional plane including a first optical axis AX1 passing through the projection system 12 and a specific line parallel to a third reflection surface 21c of a light guide member 21, which will be described later, extends, and a second direction D2 corresponds to the direction in which a horizontal cross-sectional plane including the first optical axis AX1 and a normal to the third reflection surface 21c extends. In other words, the first direction D1 is parallel to a line of intersection CL of a first reflection surface 21a and the third reflection surface 21c of the light guide member 21, which will be described later, and the second direction D2 is parallel to the plane of the first reflection surface 21a and perpendicular to the line of intersection CL of the first reflection surface 21a and the third reflection surface 21c. That is, in the position of the liquid crystal display device 32, the first direction D1 corresponds to a vertical Y direction, and the second direction D2 corresponds to a horizontal X direction.

The effective length of the liquid crystal display device 32 is longer in the second direction D2 than in the first direction D1, that is, the liquid crystal display device 32 has a horizontally elongated shape. On the other hand, the width of a light exiting aperture of the projection system 12 is longer in the first direction D1 than in the second direction D2, that is, the light exiting aperture has a vertically elongated shape.

The light guide device 20 includes the light guide member 21 and a frame portion 23. The light guide member 21 is bonded to the frame portion 23 to form a flat plate-shaped optical member generally extending in parallel to the XY plane.

In the light guide device 20, the light guide member 21 guides light while totally reflects the light off first and second reflection surfaces 21a, 21b. In some directions, the guided light is reflected in accordance with the law of reflection, and in other directions, the guided light is not reflected or does not follow the law of reflection. Consider now an image guided through the light guide member 21. The horizontal direction in which the guided light is reflected multiple times in accordance with the law of reflection, that is, a trapping direction, is perpendicular to the first and second reflection surfaces 21a, 21b (parallel to Z axis) and corresponds to the second direction D2 in the liquid crystal display device 32 when the optical path is unfolded down to the light source, as will be described later. The vertical direction in which the guided light is not reflected or does not follow the law of reflection, that is, a free propagation direction, is parallel to the first and second reflection surfaces 21a, 21b and the third reflection surface 21c (parallel to Y axis) and corresponds to the first direction D1 in the liquid crystal display device 32 when the optical path is unfolded down to the light source, as will be described later.

Figure 5:
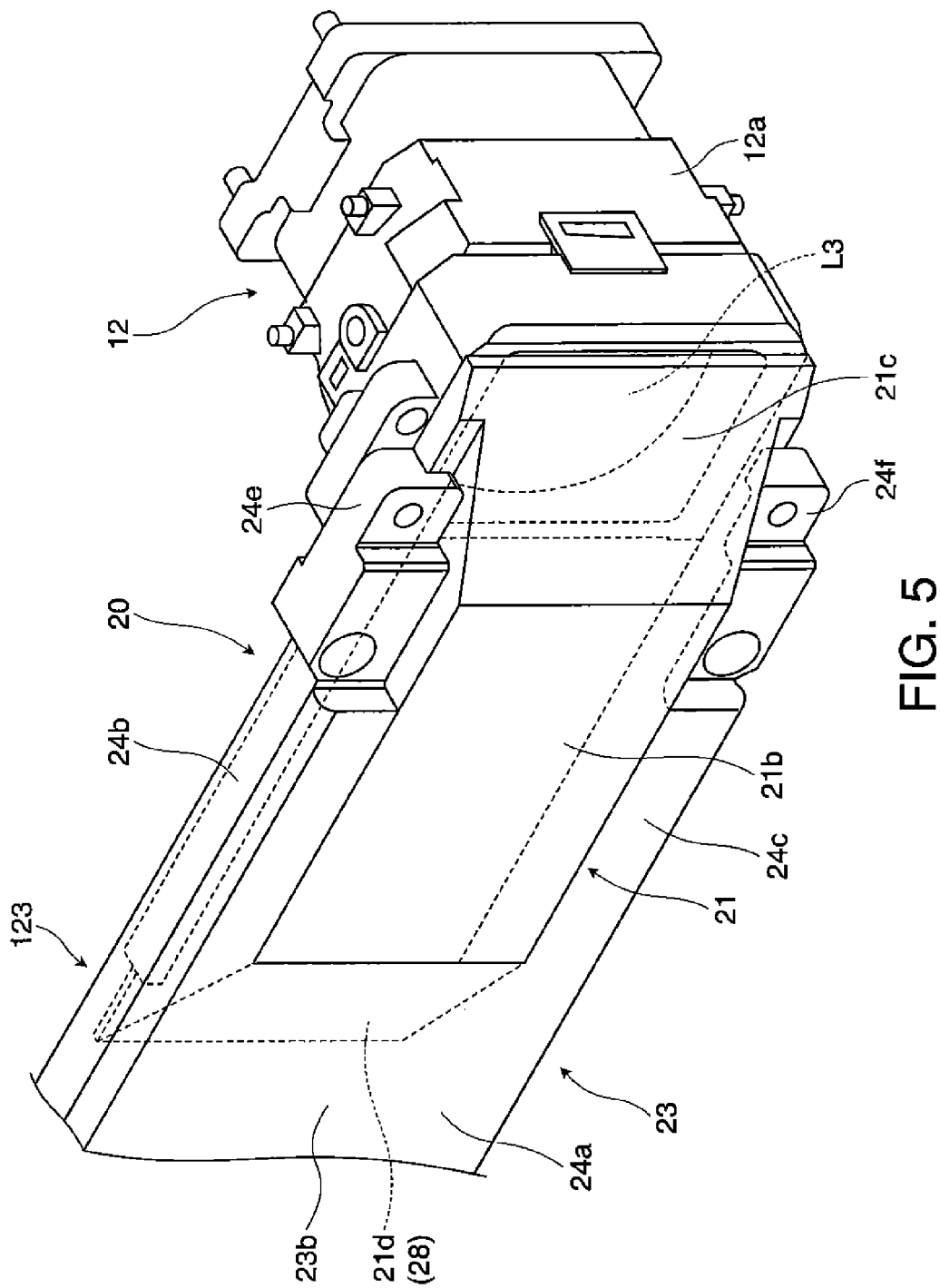
FIG. 5 is a perspective view describing the main portion of the first display apparatus.

The light guide member 21 is a trapezoidal prism-shaped member in a plan view, as shown in FIGS. 3A to 3D, and the frame portion 23 is one-half of an H-shaped support frame 123 in a front view and has a square bracket-like or U-like exterior shape, as shown in FIGS. 4A to 4D. The light guide member 21 fits in the support frame 123 in such a way that each hollowed portion SP thereof is filled with the light guide member 21 and bonded and fixed to a central member 24a, an upper support member 24b, and a lower support member 24c of the support frame 123. A first connection portion 24e provided at the tip of the upper support member 24b of the support frame 123 and a second connection portion 24f provided at the tip of the lower support member 24c of the support frame 123 are connected to the lens barrel 12a of the projection system 12 with screws or any other fasteners (not shown), as also shown in FIG. 5.

The light guide member 21 has the following side surfaces: the first reflection surface 21a, the second reflection surface 21b, the third reflection surface 21c, and a fourth reflection surface 21d, as shown in FIGS. 3A to 3D and other figures. The light guide member 21 further has an upper inclined surface 21e and a lower inclined surface 21f facing each other and adjacent to the first, second, third, and fourth reflection surfaces 21a, 21b, 21c, 21d. The light guide member 21 further has a first protruding portion 21m, which is located at the boundary between the upper inclined surface 21e and the first reflection surface 21a and linearly extends along the upper inclined surface 21e, and a second protruding portion 21n, which is located at the boundary between the lower inclined surface 21f and the first reflection surface 21a and linearly extends along the lower inclined surface 21f.

The first and second reflection surfaces 21a, 21b extend along the XY plane and are set apart by the thickness t of the light guide member 21. The third reflection surface 21c is inclined to the XY plane by an acute angle α, which is equal to or smaller than 45°, and the fourth reflection surface 21d is inclined to the XY plane by an acute angle β, which is equal to or smaller than 45°. The first optical axis AX1 passing through the third reflection surface 21c and a second optical axis AX2 passing through the fourth reflection surface 21d are set parallel to each other and apart by a distance D. An end surface 21j, which will be described below in detail, between the first reflection surface 21a and the third reflection surface 21c is so provided that the ridge therebetween is removed. Similarly, an end surface 21i between the first reflection surface 21a and the fourth reflection surface 21d is so provided that the ridge therebetween is removed.

The first protruding portion 21m serves as a guide and a support when the light guide member 21 is fixed to the upper support member 24b of the support frame 123, and a step surface 21s and a side surface 21t of the first protruding portion 21m are bonded to a step surface 24s and a side surface 24t of the upper support member 24b, respectively, with an adhesive. The second protruding portion 21n serves as a guide and a support when the light guide member 21 is fixed to the lower support member 24c of the support frame 123, and a step surface 21s and a side surface 21t of the second protruding portion 21n are bonded to a step surface 24s and a side surface 24t of the lower support member 24c, respectively, with an adhesive.

Refer now back to FIG. 2A. The light guide member 21 is made of a resin material having high optical transmittance in the visible range. The light guide member 21 is a block-shaped member integrally molded in an injection molding process and formed by injecting a thermally polymerized resin material or any other suitable material into a molding die and allowing the injected material to undergo heat curing. The light guide member 21, although being an integrally formed component, can be functionally separated into a light incident portion B1, a light guide portion B2, and a light exiting portion B3.

Figure 6A:
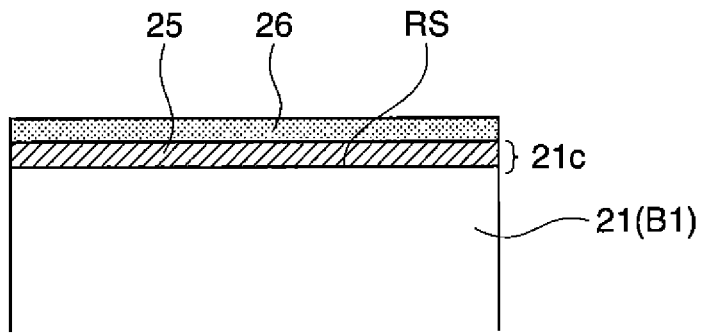
FIG. 6A describes the structure of a third reflection surface in a light incident portion of the light guide member, FIG. 6B describes the structure of first and second reflection surfaces in a light guide portion of the light guide member, and FIG. 6C describes the structure of a fourth reflection surface in a light exiting portion of the light guide member.

The light incident portion B1 is a triangular prism-shaped portion and has a light incident surface IS, which is part of the first reflection surface 21a, and the third reflection surface 21c, which faces the light incident surface IS. The light incident surface IS is a flat surface located on the rear side or the viewer side where image light GL from the image formation device 10 is introduced. The light incident surface IS faces the projection system 12 and extends perpendicularly to the first optical axis AX1. The third reflection surface 21c is a rectangular total reflection mirror that reflects the image light GL having passed through the light incident surface IS and guides the reflected light into the light guide portion B2. The third reflection surface 21c has a mirror layer 25 and is coated with a protective layer 26 (see FIG. 6A). The mirror layer 25 is a total reflection coating and formed by forming a film made of aluminum or any other suitable material on an inclined surface RS of the light guide member 21 in an evaporation process. The third reflection surface 21c is inclined to the first optical axis AX1 of the projection system 12 or the XY plane, for example, by the acute angle α ranging from 25° to 27°. The third reflection surface 21c deflects the image light GL, which is incident through the light incident surface IS and directed in the +Z direction as a whole, in a direction between the −X direction and the −Z direction as a whole, whereby the image light GL is reliably coupled into the light guide portion B2.

Figure 6B:
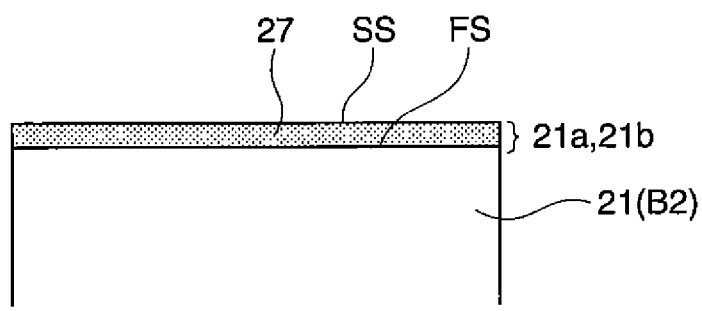

The light guide portion B2 has the first reflection surface 21a and the second reflection surface 21b, which are two flat surfaces facing each other and extending in parallel to the XY plane and totally reflect the image light deflected in the light incident portion B1. The distance between the first reflection surface 21a and the second reflection surface 21b, that is, the thickness t of the light guide member 21, is set at, for example, about 9 mm. It is assumed in this description that the first reflection surface 21a is located on the rear side or the viewer side, which is close to the image formation device 10, and that the second reflection surface 21b is located on the front side or the outside-world side, which is far from the image formation device 10. In this case, the first reflection surface 21a works not only as the light incident surface IS described above but also as a light exiting surface OS, which will be described below. Each of the first and second reflection surfaces 21a, 21b is a total reflection surface using a difference in refractive index and has no mirror layer or any other reflection coating provided thereon. Instead, each of the first and second reflection surfaces 21a, 21b is coated with a hard coat layer 27, which prevents any damage to the surface and any decrease in resolution of an image (see FIG. 6B). The hard coat layer 27 is formed by forming a film made of a UV curing resin, a heat curing resin, or any other suitable material on a flat surface FS of the light guide member 21 in a dipping process or a spray coating process. The image light GL reflected off the third reflection surface 21c of the light incident portion B1 is first incident on the first reflection surface 21a and totally reflected. The image light GL is then incident on the second reflection surface 21b and totally reflected. After the actions described above are repeated, the image light is guided to the far side of the light guide device 20, that is, the −X side, where the light exiting portion B3 is provided. Since the first and second reflection surfaces 21a, 21b have no reflection coating provided thereon, outside-world light or external light incident from the outside world on the second reflection surface 21b passes through the light guide portion B2 with high transmittance. That is, the light guide portion B2 has a see-through configuration through which one can see an outside-world image.

The total reflection at the first and second reflection surfaces 21a, 21b described above is achieved by appropriately setting the refractive index of the hard coat layer 27 and can be designed to occur inside a surface SS of the hard coat layer 27 or inside the flat surface FS.

Figure 6C:
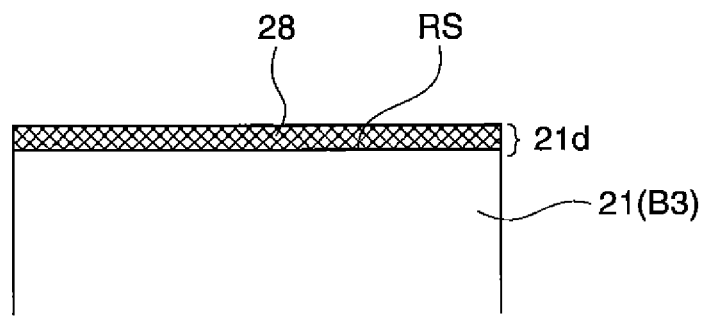

The light exiting portion B3 is a triangular prism-shaped portion and has a light exiting surface OS, which is part of the first reflection surface 21a, and the fourth reflection surface 21d, which faces the light exiting surface OS. The light exiting surface OS is a flat surface located on the front side and allowing the image light GL to exit toward the eye EY of the viewer. The light exiting surface OS is part of the first reflection surface 21a as in the case of the light incident surface IS and extends perpendicularly to the second optical axis AX2. The distance D between the second optical axis AX2 passing through the light exiting portion B3 and the first optical axis AX1 passing through the light incident portion B1 is set, for example, at 50 mm in consideration of the width of the head of the viewer and other factors. The fourth reflection surface 21d is a rectangular flat surface that reflects the image light GL incident thereon via the first and second reflection surfaces 21a, 21b and allows the reflected light to go out of the light exiting portion B3, and part of the fourth reflection surface 21d has, for example, a half-silvered mirror layer 28 (see FIG. 6C). The half-silvered mirror layer 28 is formed by forming a film made of Ag or any other suitable material in an evaporation process on an inclined surface RS of the light guide member 21 on the side where the third reflection surface 21c is present. The reflectance of the half-silvered mirror layer 28 is set, for example, at 20%, and the transmittance thereof is set, for example, at 80%. The fourth reflection surface 21d is inclined to the second optical axis AX2, which is perpendicular to the first reflection surface 21a, or the XY plane, for example, by the acute angle β ranging from 25° to 27°. The fourth reflection surface 21d partially reflects the image light GL incident thereon via the first and second reflection surfaces 21a, 21b of the light guide portion B2 to deflect the reflected light in the −Z direction as a whole, whereby the image light GL passes through the light exiting surface OS. Image light GL having passed through the fourth reflection surface 21d is incident on the frame portion 23 and is not used to form any images.

A description will be made of optical features of the frame portion 23. The frame portion 23 has the same refractive index as that of the light guide member 21 and has a first surface 23a, a second surface 23b, and a third surface 23c. The first and second surfaces 23a, 23b extend along the XY plane. The third surface 23c is inclined to the XY plane and faces the fourth reflection surface 21d of the light guide member 21 in parallel thereto. The frame portion 23 is made of a resin material having high optical transmittance in the visible range as the light guide member 21 is. The frame portion 23 is a block-shaped member integrally molded in an injection molding process and formed by injecting a thermally polymerized resin material or any other suitable material into a molding die and allowing the injected material to undergo heat curing.

In the frame portion 23, the first surface 23a is located not only in an extension plane of the first reflection surface 21a provided on the light guide member 21 but also on the rear side close to the eye EY of the viewer, and the second surface 23b is located not only in an extension plane of the second reflection surface 21b provided on the light guide member 21 but also on the front side far from the eye EY of the viewer. Each of the first and second surfaces 23a, 23b is coated with a hard coat layer that prevents any damage to the surface and any decrease in resolution of an image. The third surface 23c is a rectangular light transmissive surface and inclined to the first surface 23a, for example, by an obtuse angle ranging from 155° to 153° and inclined to the second surface 23b, for example, by an acute angle ranging from 25° to 27° so that the third surface 23c coincides with the fourth reflection surface 21d of the light guide member 21. That is, the angle between the third surface 23c and the second surface 23b is equal to the acute angle β between the first reflection surface 21a and the fourth reflection surface 21d of the light guide member 21. Similarly, the angle between the third surface 23c and the first surface 23a is equal to an obtuse angle ε between the second reflection surface 21b and the fourth reflection surface 21d of the light guide member 21.

The portion of the frame portion 23 and the light guide member 21 where they are bonded to each other and the vicinity of the portion, that is, a portion located in front of and facing the eye of the viewer, form a see-through portion B4. The transparent portion of the frame portion 23 that forms the see-through portion B4 is a portion that allows the viewer to experience satisfactory see-through observation and hereinafter called a light transmissive portion 23k. Part of the light transmissive portion 23k, a wedge-shaped member 23m sandwiched between the second surface 23b and the third surface 23c, which form an acute angle, and widening in the −X direction, is bonded to the light exiting portion B3, which also has a wedge-like shape, to form a central portion in the X direction in the see-through portion B4, which generally has a flat-plate shape. Since no mirror layer or reflection coating is provided on the first and second surfaces 23a, 23b of the light transmissive portion 23k, the see-through portion B4 transmits outside-world light GL' with high transmittance, as the light guide portion B2 of the light guide member 21 does. The third surface 23c is also a light transmissive surface that transmits the outside-world light GL' with high transmittance, but the outside-world light GL' is attenuated, for example, by 20% when it passes through the third surface 23c because the fourth reflection surface 21d of the light guide member 21 has the half-silvered mirror layer 28. That is, the viewer views the image light GL attenuated to 20% but superimposed with the outside-world light GL' attenuated to 80%.

C. Structure of Support Frame

The frame portion 23 described above is provided for the left eye and is the left half of the support frame 123 shown in FIGS. 4A to 4D. That is, the support frame 123 also has a right-half frame portion 23 for the right eye that surrounds and supports another light guide member disposed symmetrically to the light guide member 21 shown in FIG. 3A about the central line of the support frame 123.

In the support frame 123, the central member 24a has a pair of right and left light transmissive portions 23k. A hollowed portion 24x in which a nose pad is fit is formed in a lower central portion of the central member 24a. The frame portion 23 extending to the left of the central member 24a includes the corresponding light transmissive portion 23k, upper support member 24b, and lower support member 24c. Among them, the pair of upper support member 24b and lower support member 24c sandwich the left light guide member 21 in the up-down direction so that the light transmissive portion 23k is fixed. The support members 24c and 24b along with the light transmissive portions 23k precisely position and fix the light guide member 21 with respect to the light transmissive portion 23k not only in the up-down Y direction but also in the right-left X direction and the front-rear Z direction. The above description of the frame portion 23 extending to the left of the central member 24a also holds true for the frame portion 23 extending to the right of the central member 24a because the two frame portions 23 are the same but reversed in the right-left direction.

To fix the prism-shaped light guide member 21 to each of the frame portions 23 of the support frame 123, the fourth reflection surface 21d of the light guide member 21 is bonded to the third surface 23c provided on the central member 24a of the support frame 123 with an adhesive. In the bonding process, the light guide member 21 can be precisely positioned with respect to the frame portion 23 by lightly pressing the light guide member 21 to not only allow the end surface 21i thereof to come into contact with a locking surface 23g formed at the boundary between the third surface 23c and the first surface 23a but also allow the light guide member 21 to fit into the hollowed portion SP. That is, the locking surface 23g of the frame portion 23 is perpendicular to the first surface 23a and parallel to the YZ plane and has an alignment function in the X direction. Further, sandwiching surfaces 23q formed along the upper and lower edges of the third surface 23c of the frame portion 23 are perpendicular to the first surface 23a and other surfaces and parallel to the XZ plane and has an alignment function in the Y direction. The side surfaces 24t of the upper and lower support members 24b, 24c are also parallel to the XZ plane and have an auxiliary alignment function in the Y direction. Further, the step surfaces 24s of the upper and lower support members 24b, 24c are parallel to the XY plane and have an auxiliary alignment function in the Z direction. That is, the locking surface 23g, the sandwiching surfaces 23q, the side surfaces 24t, and the step surfaces 24s of the frame portion 23 function as positioning members for positioning the light guide member 21.

Among the positioning members described above, since the locking surface 23g of the frame portion 23 has a width in the Z direction equal to the width of the end surface 21i of the light guide member 21, pressing the end surface 21i of the light guide member 21 against the locking surface 23g of the frame portion 23 and simultaneously exerting pressure on the fourth reflection surface 21d of the light guide member 21 against the third surface 23c of the frame portion 23 with an adhesive therebetween allow not only the light guide member 21 to be precisely positioned in the X direction but also the first reflection surface 21a of the light guide member 21 to be readily flush with the first surface 23a of the frame portion 23 and the second reflection surface 21b of the light guide member 21 to be readily flush with the second surface 23b of the frame portion 23. Further, since the thickness of the adhesive between the third surface 23c and the fourth reflection surface 21d can be small and readily adjusted, the positional relationship between the frame portion 23 and the light exiting portion B3 of the light guide member 21 can be very precise also in the Z direction. That is, the light exiting portion B3 of the light guide member 21 will not shift relative to the frame portion 23 in the front-rear direction. It is noted that the end surface 21i can be a mirror surface, can have a relatively high reflectance coating formed thereon, or can be roughened.

The upper support member 24b of each of the frame portions 23 has not only the sandwiching surface 23q described above, which aligns an upper sandwiched surface 21q of the light guide member 21 in the Y direction when the light guide member 21 is attached, but also the step surface 24s, which supports the upper first protruding portion 21m of the light guide member 21 in the Z direction, and the side surface 24t, which positions the upper first protruding portion 21m in the Y direction when the light guide member 21 is attached. The first protruding portion 21m of the light guide member 21 is fixed to the step surface 24s and the side surface 24t of the upper support member 24b with an adhesive. To attach the light guide member 21, the upper inclined surface 21e of the light guide member 21 is also bonded to an upper inner surface 23d provided on the upper support member 24b with an adhesive. Further, the upper sandwiched surface 21q of the light guide member 21 is bonded to the sandwiching surface 23q of the upper support member 24b with an adhesive. As described above, fixing the light guide member 21 to the frame portion 23 by using the upper support member 24b prevents an excessive load from acting on the fourth reflection surface 21d having the half-silvered mirror layer 28.

The lower support member 24c of each of the frame portions 23 has not only the second sandwiching surface 23q described above, which aligns a lower sandwiched surface 21q of the light guide member 21 in the Y direction when the light guide member 21 is attached, but also the step surface 24s, which supports the lower second protruding portion 21n of the light guide member 21 in the Z direction, and the side surface 24t, which positions the lower second protruding portion 21n in the Y direction when the light guide member 21 is attached. The second protruding portion 21n of the light guide member 21 is fixed to the step surface 24s and the side surface 24t of the lower support member 24c with an adhesive. To attach the light guide member 21, the lower inclined surface 21f of the light guide member 21 is also bonded to a lower inner surface 23e provided on the lower support member 24c with an adhesive. Further, the lower sandwiched surface 21q of the light guide member 21 is bonded to the sandwiching surface 23q of the lower support member 24c with an adhesive. As described above, fixing the light guide member 21 to the frame portion 23 by using the lower support member 24c prevents an excessive load from acting on the fourth reflection surface 21d having the half-silvered mirror layer 28.

The connection portion 24e provided at the end of the upper support member 24b and the connection portion 24f provided at the end of the lower support member 24c are used not only to fix the lens barrel 12a of the projection system 12 to the frame portions 23 but also to attach the housing 141 shown in FIG. 1.

D. Summary of Optical Path of Image Light

Figure 7A:
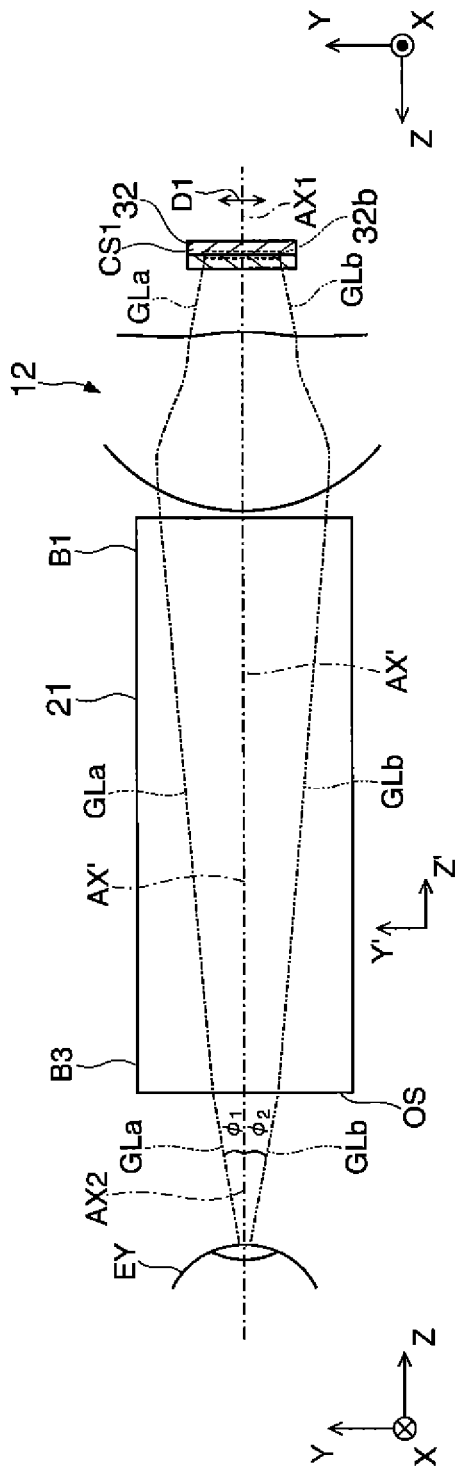
FIG. 7A is a conceptual diagram showing an unfolded optical path in a plane including a vertical first direction.

FIG. 7A describes the optical path in a vertical cross-sectional plane CS1 of the liquid crystal display device 32 corresponding to the first direction D1. In the vertical cross-sectional plane along the first direction D1, that is, the YZ plane (Y' Z' plane after optical path is unfolded), image light having exited from the liquid crystal display device 32 is defined as follows: Let image light GLa be a component that exits from the upper end (+Y side) of a display area 32b indicated by the long-dashed short-dashed line in FIG. 7A, and let image light GLb be a component that exits from the lower end (−Y side) of the display area 32b indicated by the long-dashed double-dotted line in FIG. 7A.

The upper image light GLa is converted into a collimated light flux through the projection system 12, travels along an unfolded optical axis AX', passes through the light incident portion B1, the light guide portion B2, and the light exiting portion B3 of the light guide member 21, and enters the eye EY of the viewer with the collimated light flux inclined downward to the optical axis AX' by an angle of incidence $\phi_1$. On the other hand, the lower image light GLb is converted into a collimated light flux through the projection system 12, travels along the unfolded optical axis AX', passes through the light incident portion B1, the light guide portion B2, and the light exiting portion B3 of the light guide member 21, and enters the eye EY of the viewer with the collimated light flux inclined upward to the optical axis AX' by an angle of incidence $\phi_2$ ($|\phi_2|=|\phi_1|$). The angles $\phi_1$ and $\phi_2$ correspond to upper and lower half viewing angles, each of which is set, for example, at 6.5°.

Figure 7B:
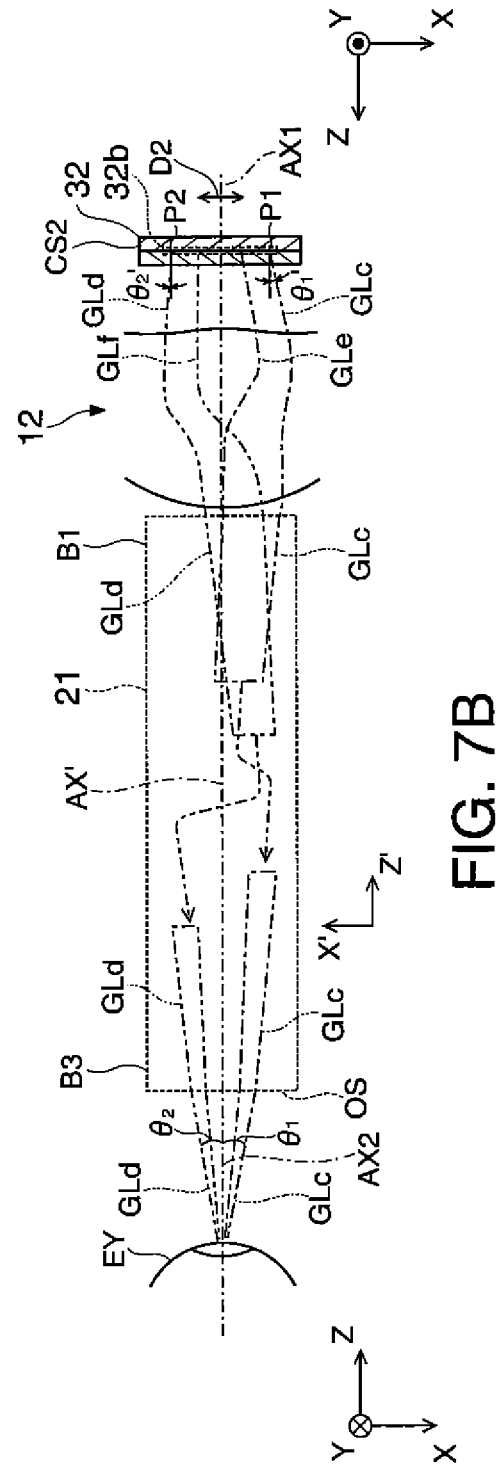
FIG. 7B is a conceptual diagram showing the unfolded optical path in a plane including a horizontal second direction.

FIG. 7B describes the optical path in a horizontal cross-sectional plane CS2 of the liquid crystal display device 32 corresponding to the second direction (trapping direction or combining direction) D2. In the horizontal cross-sectional plane along the second direction (trapping direction or combining direction) D2, that is, the XZ plane (X' Z' plane after optical path is unfolded), image light having exited from the liquid crystal display device 32 is defined as follows: Let image light GLc be a component that exits from a first display point P1 at the right end (+X side) of the display area 32b in a front view indicated by the long-dashed short-dashed line in FIG. 7B, and let image light GLd be a component that exits from a second display point P2 at the left end (−X side) of the display area 32b in the front view indicated by the long-dashed double-dotted line in FIG. 7B. In FIG. 7B, image light GLe that exits from a point in a right inner portion of the display area 32b and image light GLf that exits from a point in a left inner portion of the display area 32b are also shown for reference purposes.

The image light GLc from the first display point P1, which is located on the right side, is converted into a collimated light flux through the projection system 12, travels along the unfolded optical axis AX', passes through the light incident portion B1, the light guide portion B2, and the light exiting portion B3 of the light guide member 21, and enters the eye EY of the viewer with the collimated light flux inclined leftward to the optical axis AX' by an angle of incidence $\theta_1$. On the other hand, the image light GLd from the second display point P2, which is located on the left side, is converted into a collimated light flux through the projection system 12, travels along the unfolded optical axis AX', passes through the light incident portion B1, the light guide portion B2, and the light exiting portion B3 of the light guide member 21, and enters the eye EY of the viewer with the collimated light flux inclined rightward to the optical axis AX' by an angle of incidence $\theta_2$ ($|\theta_2|=|\theta_1|$). The angles $\theta_1$ and $\theta_2$ correspond to left and right half viewing angles, each of which is set, for example, at 10°.

In the horizontal second direction D2, since the image light fluxes GLc and GLd are reflected in accordance with the law of reflection in the light guide member 21 and differ from each other in terms of the number of reflection, the image light fluxes GLc and GLd are drawn discontinuously in the light guide member 21. In the horizontal direction, in which the resultant image is horizontally reversed, the right half of an image displayed by the liquid crystal display device 32 and the left half of the image displayed by the liquid crystal display device 32 are seamlessly connected to each other without any displacement by precisely shaping the light guide member 21, which will be described later in detail. In consideration of the difference in the number of reflection in the light guide member 21 between the image light fluxes GLc and GLd, an angle $\theta_1'$ at which the right image light GLc exits and an angle $\theta_2'$ at which the left image light GLd exits are set differently.

In the configuration described above, each of the image light fluxes GLa, GLb, GLc, and GLd incident on the eye EY of the viewer forms a virtual image at infinity. In the vertical first direction D1, the liquid crystal display device 32 forms an erect image, whereas in the horizontal second direction D2, the liquid crystal display device 32 forms an inverted image.

E. Optical Path of Image Light in Horizontal Direction

Figure 8:
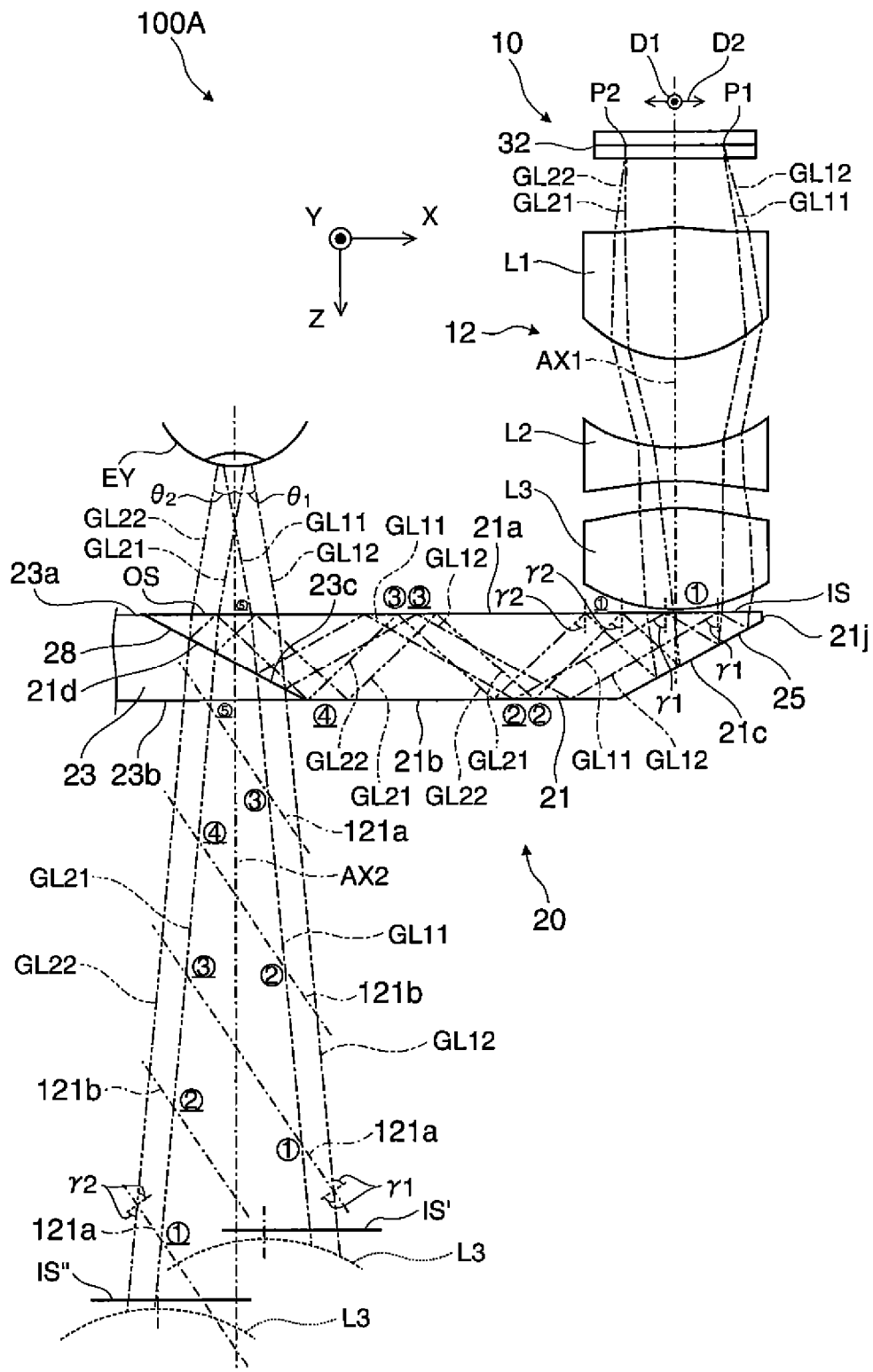
FIG. 8 is a cross-sectional view specifically describing the optical path in the optical system of the virtual image display apparatus.

FIG. 8 is a cross-sectional view describing a specific optical path in the first display apparatus 100A. The projection system 12 includes three lenses, L1, L2, and L3.

Image light GL11 and GL12 from the first display point P1, which is located on the right side of the liquid crystal display device 32, are converted into collimated light fluxes when passing through the lenses L1, L2, and L3 in the projection system 12 and incident on the light incident surface IS of the light guide member 21. The image light GL11 and GL12 introduced into the light guide member 21 repeatedly undergo total reflection at the first and second reflection surfaces 21a, 21b at the same angle of reflection and eventually exit through the light exiting surface OS in the form of collimated light flux. Specifically, the image light GL11 and GL12 in the form of collimated light flux are reflected off the third reflection surface 21c of the light guide member 21 and then incident on and totally reflected off the first reflection surface 21a of the light guide member 21 at a first angle of reflection γ1 (first total reflection). The image light GL11 and GL12 are then incident on and totally reflected off the second reflection surface 21b at the same first angle of reflection γ1 (second total reflection) and then incident on and totally reflected off the first reflection surface 21a again (third total reflection). As a result, the image light GL11 and GL12 have been totally reflected off the first and second reflection surfaces 21a, 21b three times in total and then incident on the fourth reflection surface 21d. The image light GL11 and GL12 are reflected off the fourth reflection surface 21d at the same angle of reflection at which they have been reflected off the third reflection surface 21c and exit in the form of collimated light flux through the light exiting surface OS. The exiting light fluxes are inclined to the second optical axis AX2, which is perpendicular to the light exiting surface OS, by the angle $\theta_1$.

Image light GL21 and GL22 from the second display point P2, which is located on the left side of the liquid crystal display device 32, are converted into collimated light fluxes when passing through the lenses L1, L2, and L3 in the projection system 12 and incident on the light incident surface IS of the light guide member 21. The image light GL21 and GL22 introduced into the light guide member 21 repeatedly undergo total reflection at the first and second reflection surfaces 21a, 21b at the same angle of reflection and eventually exit through the light exiting surface OS in the form of collimated light flux. Specifically, the image light GL21 and GL22 in the form of collimated light flux are reflected off the third reflection surface 21c of the light guide member 21 and then incident on and totally reflected off the first reflection surface 21a of the light guide member 21 at a second angle of reflection γ2 (γ2<γ1) (first total reflection). The image light GL21 and GL22 are then incident on and totally reflected off the second reflection surface 21b at the same second angle of reflection γ2 (second total reflection), incident on and totally reflected off the first reflection surface 21a again (third total reflection), incident on and totally reflected off the second reflection surface 21b again (fourth total reflection), and incident on and totally reflected off the first reflection surface 21a again (fifth total reflection). As a result, the image light GL21 and GL22 have been totally reflected off the first and second reflection surfaces 21a, 21b five times in total and then incident on the fourth reflection surface 21d. The image light GL21 and GL22 are reflected off the fourth reflection surface 21d at the same angle of reflection at which they have been reflected off the third reflection surface 21c and exit in the form of collimated light flux through the light exiting surface OS. The exiting light fluxes are inclined to the second optical axis AX2, which is perpendicular to the light exiting surface OS, by the angle $\theta_2$ ($\theta_2 \approx \theta_1$).

FIG. 8 shows a virtual first surface 121a, which can be drawn when the light guide member 21 is unfolded and corresponds to the first reflection surface 21a, and a virtual second surface 121b, which can be drawn when the light guide member 21 is unfolded and corresponds to the second reflection surface 21b. Unfolding the light guide member 21 shows that the image light GL11 and GL12 from the first display point P1 pass through a light incident equivalent surface IS' corresponding to the light incident surface IS, pass through the first surface 121a twice, pass through the second surface 121b once, exit through the light exiting surface OS, and enter the eye EY of the viewer, and that the image light GL21 and GL22 from the second display point P2 pass through a light incident equivalent surface IS" corresponding to the light incident surface IS, pass through the first surface 121a three times, pass through the second surface 121b twice, exit through the light exiting surface OS, and enter the eye EY of the viewer. From a different point of view, the viewer can view a virtual image through the lenses L3, which are present in the vicinity of the light incident equivalent surfaces IS' and IS" located in two different positions, in the projection system 12.

Figure 9A:
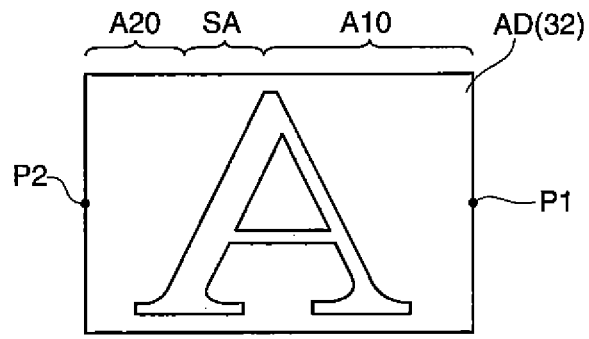
FIG. 9A shows a display surface of a liquid crystal display device, FIG. 9B conceptually describes a virtual image of the liquid crystal display device viewed by a viewer, and FIGS. 9C and 9D describe partial images that form the virtual image.
Figure 9B:
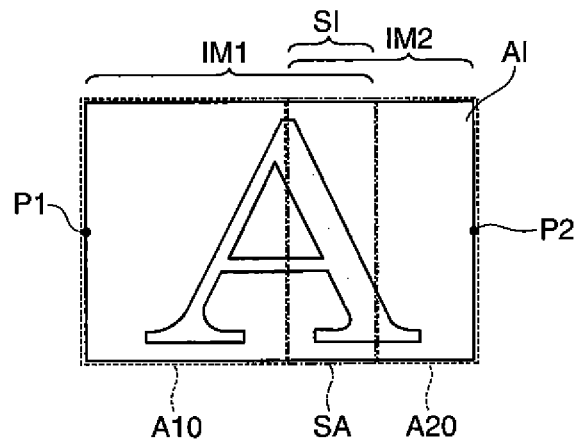
Figure 9C:
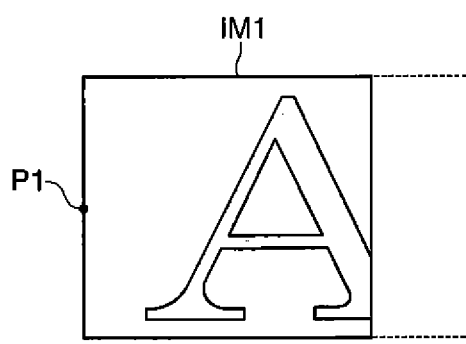
Figure 9D:
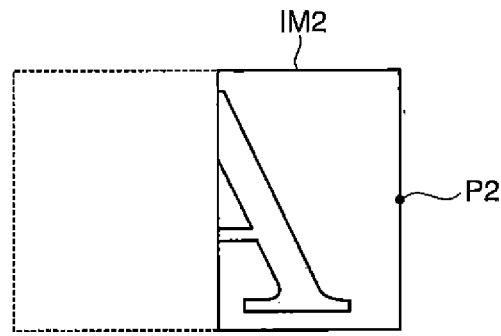

FIG. 9A conceptually describes a display surface of the liquid crystal display device 32. FIG. 9B conceptually describes a virtual image of the liquid crystal display device 32 viewed by the viewer. FIGS. 9C and 9D describe partial images that form the virtual image. A rectangular image formation area AD provided on the liquid crystal display device 32 shown in FIG. 9A is viewed as a virtual image display area AI shown in FIG. 9B. A first projected image IM1 corresponding to a portion from the center of the image formation area AD of the liquid crystal display device 32 to the right side thereof is formed on the left side of the virtual image display area AI, and the first projected image IM1 is a partial image with its right portion truncated, as shown in FIG. 9C. Further, a projected image IM2 corresponding to a portion from the center of the image formation area AD of the liquid crystal display device 32 to the left side thereof is formed on the right side of the virtual image display area AI, and the second projected image IM2 is a partial image with its left portion truncated, as shown in FIG. 9D.

A first partial area A10 of the liquid crystal display device 32 shown in FIG. 9A where only the first projected image (virtual image) IM1 is formed includes, for example, the first display point P1 at the right end of the liquid crystal display device 32 and outputs the image light GL11 and GL12, which will undergo total reflection three times in total in the light guide portion B2 of the light guide member 21. A second partial area A20 of the liquid crystal display device 32 where only the second projected image (virtual image) IM2 is formed includes, for example, the second display point P2 at the left end of the liquid crystal display device 32 and outputs the image light GL21 and GL22, which will undergo total reflection five times in total in the light guide portion B2 of the light guide member 21. Image light from a vertically elongated band SA sandwiched between the first partial area A10 and the second partial area A20 and located in a region close to the center of the image formation area AD of the liquid crystal display device 32 forms a superimposed image SI shown in FIG. 9B. That is, the image light from the band SA of the liquid crystal display device 32 forms part of the first projected image IM1, which is formed by the image light GL11 and GL12 having undergone total reflection three times in total in the light guide portion B2, and part of the second projected image IM2, which is formed by the image light GL11 and GL12 having undergone total reflection five times in total in the light guide portion B2, and the thus formed partial projected images are superimposed on the virtual image display area AI. When the light guide member 21 is precisely shaped and the projection system 12 forms a precisely collimated light flux, the superimposed image SI will have no displacement or spreading between the two projected images IM1 and IM2. The horizontal width or the superimposed width of the band SA, where the two images are superimposed, can be adjusted by controlling the angular range of the illumination light SL, which illuminates the liquid crystal display device 32. In the present embodiment, in which the angular range of the illumination light SL is not particularly adjusted, the band SA has a horizontal width or a superimposed width according to divergence characteristics of the backlight light guide 31b and other components.

In the above description, the number of total reflection of the image light GL11 and GL12, which have exited from the first partial area A10 including the first display point P1 located on the right side of the liquid crystal display device 32, at the first and second reflection surface 21a, 21b is three in total, and the number of total reflection of the image light GL21 and GL22, which have exited from the second partial area A20 including the second display point P2 located on the left side of the liquid crystal display device 32, at the first and second reflection surface 21a, 21b is five in total. The number of total reflection can be changed as appropriate. That is, the number of total reflection of the image light GL11 and GL12 can be five in total and the number of total reflection of the image light GL21 and GL22 can be seven in total by adjusting the external shape of the light guide member 21 (that is, thickness t, distance D, and acute angles α and β). Further, in the above description, the numbers of total reflection of the image light GL11, GL12, GL21, and GL22 are odd numbers. The numbers of total reflection of the image light GL11, GL12, GL21, and GL22 can alternatively be even numbers by locating the light incident surface IS and the light exiting surface OS on opposite sides, that is, by changing the shape of the light guide member 21 to a parallelogram in a plan view.

F. Others

Figure 10A:
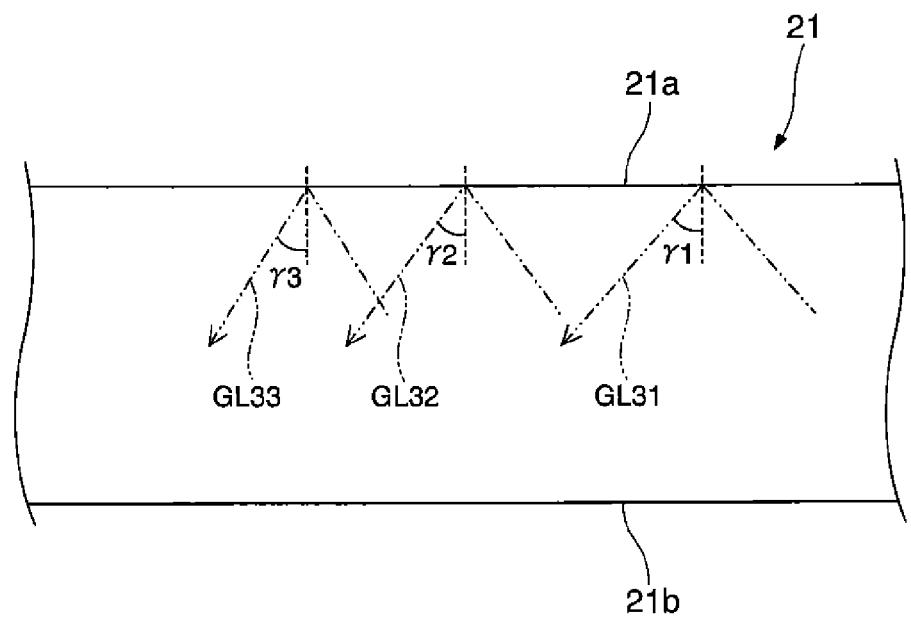
FIG. 10A describes how image light is guided in a variation, and FIG. 10B conceptually describes virtual images formed by the liquid crystal display device in the variation.
Figure 10B:
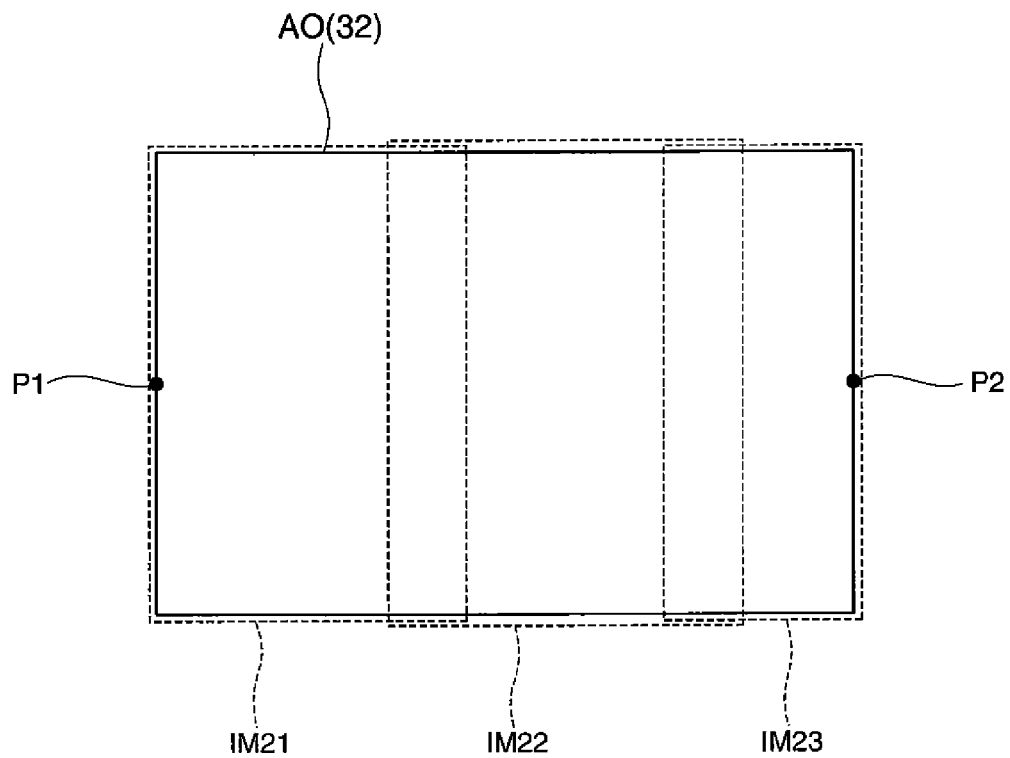

FIG. 10A describes a variation of the light guide member 21 shown in FIG. 2A and other figures. In the above description, the image light propagating through the light guide member 21 is totally reflected off the first and second reflection surfaces 21a, 21b only at the two angles of reflection γ1, γ2. Alternatively, three image light components GL31, GL32, and GL33 are allowed to be totally reflected at angles of reflection γ1, γ2, and γ3 (γ1>γ2>γ3) in the light guide member 21 in the variation shown in FIG. 10A. In this case, the image light fluxes GL having exited from the liquid crystal display device 32 propagate in three modes and are combined in the position of the eye EY of the viewer into a virtual image. In this case, the following three projected images are formed: a projected image IM21 formed on the left side of an effective display area A0 after the image light GL31 is totally reflected, for example, three times in total; a projected image IM22 formed in an area close to the center of the effective display area A0 after the image light GL32 is totally reflected, for example, five times in total; and a projected image IM23 formed on the right side of the effective display area A0 after the image light GL33 is totally reflected, for example, seven times in total, as shown in FIG. 10B.

Figure 11:
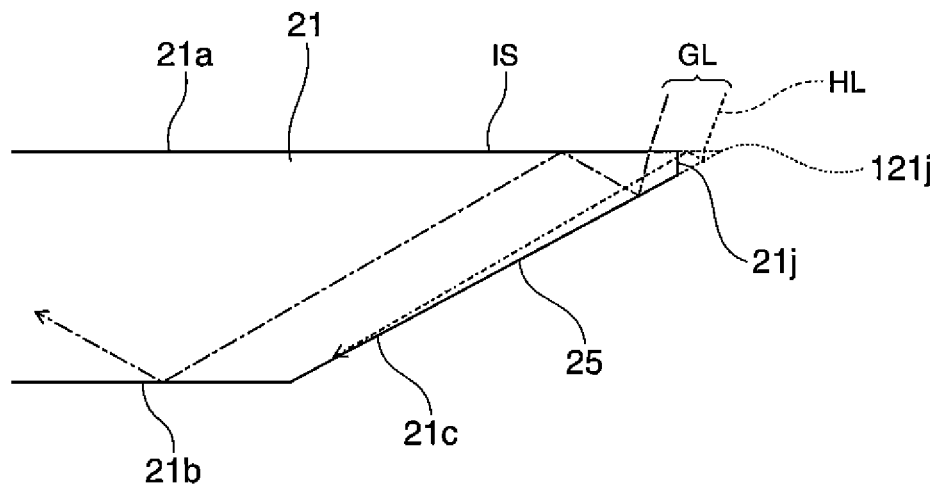
FIG. 11 describes the reason why the light guide member has an end surface for removing a ridge thereof.

FIG. 11 is an enlarged view describing the reason why the light guide member 21 shown in FIG. 2A and other figures has the end surface 21j for removing a specific ridge thereof. The image light GL incident on a portion close to a ridge 121j of the light guide member 21 is reflected off the third reflection surface 21c and then reflected off the first reflection surface 21a. In this case, however, the image light GL reflected off the first reflection surface 21a is then disadvantageously reflected off the third reflection surface 21c again. Such light HL reflected off the third reflection surface 21c multiple times is desirably removed before it contributes to the formation of a virtual image otherwise it produces unwanted ghost light. To this end, the ridge 121j is so removed that the end surface 21j is provided and a certain optical path is prohibited.

Figure 12:
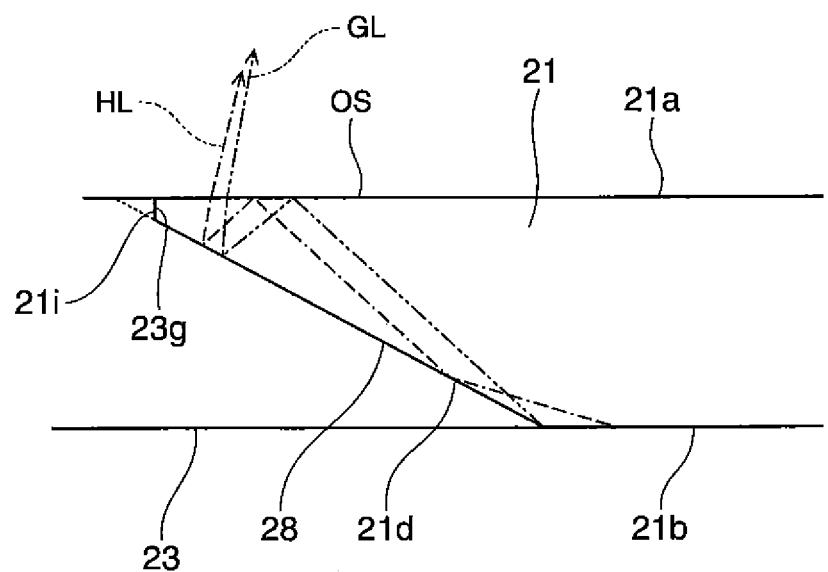
FIG. 12 describes the reason why a half-silvered mirror layer provided in the light guide member is shifted from an end surface.

FIG. 12 is an enlarged view describing the reason why the half-silvered mirror layer 28, which is provided in association with the third reflection surface 21c of the light guide member 21 shown in FIG. 2A and other figures, is so formed that the half-silvered mirror layer 28 is shifted from the end surface 21i. Providing the half-silvered mirror layer 28 shifted from the end surface 21i by a predetermined distance as shown in FIG. 12 prevents intended image light GL propagating through the light guide member 21 from being reflected twice or more off the fourth reflection surface 21d and entering the eye EY of the viewer as unwanted light HL, prevents image light or other light reflected less than three times in the light guide portion B2 and passing therethrough, which is unwanted light HL, from being reflected twice or more off the fourth reflection surface 21d and entering the eye EY of the viewer, and prevents other unwanted actions, whereby no ghost light will enter the eye of the viewer.

In the virtual image display apparatus 100 according to the embodiment described above, the image light GL reflected off the third reflection surface 21c of the light incident portion B1 propagates while totally reflected off the first and second reflection surfaces 21a, 21b of the light guide portion, is reflected off the fourth reflection surface 21d of the light exiting portion B3, and then enters as a virtual image the eye EY of the viewer. In this process, since the number of reflection of the first image light GL11 and GL12 in the light guide portion, which have exited from the first partial area A10 including the first display point P1 in the image display device 11, differs from the number of reflection of the second image light GL21 and GL22 in the light guide portion B2, which have exited from the second partial area A20 including the second display point P2 in the image display device 11, the angular width of the exiting angle of the image light fluxes GL that exit out of the light exiting portion B3 can be increased. That is, the image light fluxes GL acquired from the different partial areas A10 and A20 in the image display device 11 can have relatively wide viewing angles, whereby the size of a displayed virtual image viewed through the light exiting portion B3 can be increased. As described above, since employing the structure in which image light fluxes GL reflected different times are acquired allows the size of the light exiting portion B3 to be increased to cover the pupil without a large increase in the thickness of the light guide portion B2, whereby it is not necessary to employ the pupil division method with the light exiting portion B3 located close to the pupil, and the eye ring diameter can be increased for satisfactory see-through observation.

Further, in the virtual image display apparatus 100 described above, since the support frame 123 includes the light transmissive portions 23k, which is combined with the light guide members 21 to form the see-through portions B4, the support frame 123 assembled with the light guide members 21 for image light observation allows see-through observation of an outside-world object through the see-through portions B4. Further, providing the light transmissive portions 23k in the support frame 123 can increase the strength of the support frame 123 while reducing the weight of the light guide members 21.

The invention has been described with reference to the above embodiment, but the invention is not limited thereto. The invention can alternatively be implemented in a variety of other aspects to the extent that they do not depart from the substance of the invention. For example, the following variations can be employed.

In the embodiment described above, the locking surface 23g is formed in the frame portion 23 along the entire boundary between the third surface 23c and the first surface 23a. The locking surface 23g can alternatively be provided along part of the boundary between the third surface 23c and the first surface 23a so that the end surface 21i of the light guide member 21 partially faces the locking surface 23g and is positioned thereby.

In the embodiment described above, the end surface 21i is formed along the entire boundary between the first reflection surface 21a and the fourth reflection surface 21d of the light guide member 21. The end surface 21i can alternatively be provided along part of the boundary between the first reflection surface 21a and the fourth reflection surface 21d so that the end surface 21i partially faces the locking surface 23g of the frame portion 23 and is positioned thereby.

In the embodiment described above, the illumination light SL from the illuminator 31 is not particularly configured to have any directivity. The illumination light SL can alternatively have directivity according to the position on the liquid crystal display device 32, whereby the liquid crystal display device 32 can be efficiently illuminated, and the amount of luminance unevenness according to the position in the image light GL can be reduced.

In the embodiment described above, the luminance of an image displayed by the liquid crystal display device 32 is not particularly adjusted. The display luminance can alternatively be adjusted in accordance with the ranges of the projected images IM1 and IM2 shown in FIG. 9B or the degree of how much the projected images IM1 and IM2 overlap with each other.

In the embodiment described above, the half-silvered mirror layer 28 provided on the fourth reflection surface 21d has a reflectance of 20%, which gives see-through observation a high priority. The half-silvered mirror layer 28 can alternatively have a reflectance of 50% or higher, which gives image light observation a high priority. The half-silvered mirror layer 28 can alternatively be formed on the third surface 23c of the frame portion 23 instead of on the light guide member 21.

In the embodiment described above, the image display device 11 includes the transmissive liquid crystal display device 32 and other transmissive components. The image display device 11 can alternatively include other variety of devices other than the transmissive liquid crystal display device 32. For example, a reflective liquid crystal display device can be used, or the liquid crystal display device 32 can be replaced with a digital micromirror device or any other similar device. Further, the image display device 11 can include a self-luminous device represented, for example, by an LED array and an OLED (organic EL).

In the virtual image display apparatus 100 according to the embodiment described above, each of the right and left eyes is provided with a set of image formation device 10 and light guide device 20. Alternatively, only one be the right and left eyes may be provided with the image formation device 10 and the light guide device 20 for monocular image observation.

In the embodiment described above, the first optical axis AX1 passing through the light incident surface IS is parallel to the second optical axis AX2 passing through the light exiting surface OS. The optical axes AX1 and AX2 can alternatively be not parallel to each other.

The above description has been specifically made with reference to the case where the virtual image display apparatus 100 is a head mounted display. The virtual image display apparatus 100 can alternatively be modified into a head-up display.

In the above description, image light is guided while totally reflected off the first and second reflection surfaces 21a, 21b of the light guide member 21, specifically, totally reflected off the interface with the air without any mirror, half-silvered mirror, or similar coating provided on the surfaces. It is noted that the total reflection in the present invention includes reflection off a mirror coating or a half-silvered mirror film formed on the entire or part of the first and second reflection surfaces 21a, 21b. For example, as long as the angle of incidence of image light satisfies the total reflection condition, a mirror coating or any other similar coating may be so formed on the entire or part of the first and second reflection surfaces 21a, 21b that substantially all the image light is reflected. Further, as long as sufficiently bright image light is provided, a mirror having slight transmittance may be coated on the entire or part of the first and second reflection surfaces 21a, 21b. Any of the coatings described above can also be formed on the first and second surfaces 23a, 23b of the frame portion 23.

In the above description, each of the light guide members 21 extends in the horizontal direction, in which the eyes EY are located side by side. Each of the light guide members 21 can alternatively extend in the vertical direction. In this case, the first and second optical panel portions 111, 112 are not disposed in tandem but are disposed in parallel. That is, the support frame 123 supports a pair of light guide members 21 in parallel in a single plane.

The entire disclosure of Japanese Patent Application No. 2011-022441, filed Feb. 4, 2011 is expressly incorporated by reference herein.

What is claimed is:

1. A virtual image display apparatus comprising:
   a light guide member including:
      a light guide portion;
      a light incident portion through which image light is incident on the light guide portion; and
      a light exiting portion out of which the image light guided through the light guide portion exits, the light guide member being configured to allow observation of the image light through the light exiting portion; and
   a support frame configured to include the light guide member within the support frame, wherein:
   the support frame includes a light transmissive portion that is combined with the light guide member to form a transmissive portion, the light transmissive portion being bonded to a central member of the support frame,
   the light guide portion includes a first reflection surface and a second reflection surface disposed in parallel to each other and are configured to guide light to be guided and reflected,
   the light incident portion includes a third reflection surface inclined to the first reflection surface by a predetermined angle,
   the light exiting portion includes a fourth reflection surface inclined to the first reflection surface by a predetermined angle, the fourth reflection surface includes a half-silvered mirror provided thereon, and the light guide member has an end surface between the first reflection surface and the fourth reflection surface,
   the light transmissive portion includes a wedge-shaped member bonded to the light guide member and a light transmissive surface glued to the fourth reflection surface via the half-silvered mirror, and
   the support frame includes a positioning member that positions the light guide member where the positioning member includes a locking surface formed between the first surface and the light transmissive surface and facing the end surface.

2. The virtual image display apparatus according to claim 1, wherein the light transmissive portion has a first surface disposed in parallel to the first reflection surface and a second surface disposed in parallel to the second reflection surface.

3. The virtual image display apparatus according to claim 1, wherein
   the first, second, third, and fourth reflection surfaces of the light guide member are side surfaces thereof, and the light guide member further has a top surface and a bottom surface adjacent to the first, second, third, and fourth reflection surfaces, and
   the support frame holds the light guide member by sandwiching the top and bottom surfaces of the light guide member.

4. The virtual image display apparatus according to claim 1, wherein the first reflection surface of the light guide member is so positioned to be flush with the first surface of the light transmissive portion.

5. The virtual image display apparatus according to claim 1, wherein the second reflection surface of the light guide member is so positioned to be flush with the second surface of the light transmissive portion.

6. The virtual image display apparatus according to claim 1, further comprising:
   an image display device that forms image light; and
   a projection system on which the image light having exited from the image display device is incident,
   wherein the number of reflection of first image light in the light guide portion that exits from a first partial area in the image display device differs from the number of reflection of second image light in the light guide portion that exits from a second partial area in the image display device that differs from the first partial area in terms of a trapping direction in which the guided light is reflected in accordance with the law of reflection.

7. The virtual image display apparatus according to claim 6, wherein the trapping direction is parallel to a cross-sectional plane including a first optical axis passing through the projection system and a normal to the third reflection surface.

8. The virtual image display apparatus according to claim 1, wherein the light guide member and the support frame, each of which is integrally formed in an injection molding process, are formed independent from each other.

9. The virtual image display apparatus according to claim 8, wherein each of the light guide member and the support frame is molded by using a thermally polymerized resin material.

10. The virtual image display apparatus according to claim 1, wherein a part of the light transmissive portion is bonded to the light exiting portion, such that the part of the light transmissive portion and the light exiting portion are in direct contact via an adhesive.

11. A virtual image display apparatus comprising:
   a light guide member including:
      a light guide portion;
      a light incident portion through which image light is incident on the light guide portion; and
      a light exiting portion out of which the image light guided through the light guide portion exits, the light guide member being configured to allow observation of the image light through the light exiting portion; and
   a support frame configured to include light guide member within the support frame and having a central member, wherein:
   the support frame includes a light transmissive portion that is combined with the light guide member to form a transmissive portion, the light transmissive portion being bonded to the central member of the support frame,
   the light exiting portion is disposed between the light transmissive portion and the light guide portion,
   the light guide portion includes a first reflection surface and a second reflection surface disposed in parallel to each other and are configured to guide light to be guided and reflected,
   the light incident portion includes a third reflection surface inclined to the first reflection surface by a predetermined angle,
   the light exiting portion includes a fourth reflection surface inclined to the first reflection surface by a predetermined angle, the fourth reflection surface includes a half-silvered mirror provided thereon, and the light guide member has an end surface between the first reflection surface and the fourth reflection surface,
   the light transmissive portion includes a wedge-shaped member bonded to the light guide member and a light transmissive surface glued to the fourth reflection surface via the half-silvered mirror, and
   the support frame includes a positioning member that positions the light guide member where the positioning member includes a locking surface formed between the first surface and the light transmissive surface and facing the end surface.

12. A virtual image display apparatus comprising:

a light guide member including a light guide portion, a light incident portion through which image light is incident on the light guide portion, and a light exiting portion out of which the image light guided through the light guide portion exits, the light guide member allowing observation of the image light through the light exiting portion; and a support frame that supports the light guide member, wherein:

the support frame includes a light transmissive portion that is combined with the light guide member to form a transmissive portion, the light guide portion has a first reflection surface and a second reflection surface that are disposed in parallel to each other and allow light to be guided while totally reflected, the light incident portion has a third reflection surface inclined to the first reflection surface by a predetermined angle, the light exiting portion has a fourth reflection surface inclined to the first reflection surface by a predetermined angle, the fourth reflection surface has a half-silvered mirror provided thereon, the light transmissive portion has a wedge-shaped member bonded to the light guide member, the light transmissive portion has a light transmissive surface glued to the fourth reflection surface via the half-silvered mirror, the support frame includes a positioning member that positions the light guide member, the light guide member has an end surface between the first reflection surface and the fourth reflection surface, and the support frame has a locking surface as the positioning member, the locking surface formed between the first surface and the light transmissive surface and facing the end surface.

* * * * *